United States Patent [19]

Momin

[11] Patent Number: 4,628,316
[45] Date of Patent: Dec. 9, 1986

[54] TEMPERATURE COMPENSATION CIRCUIT AND METHOD FOR POSITION SENSORS

[75] Inventor: Salim A. Momin, Troy, Mich.
[73] Assignee: Chrysler Motors Corporation, Highland Park, Mich.
[21] Appl. No.: 585,804
[22] Filed: Mar. 2, 1984
[51] Int. Cl.$^4$ .................. G08C 15/00; G08C 15/06
[52] U.S. Cl. .................. 340/870.38; 374/172; 340/870.04
[58] Field of Search .................. 340/870.04, 870.05, 340/870.06, 870.17, 870.38; 374/102, 103, 172; 324/63

[56] References Cited

U.S. PATENT DOCUMENTS

| | | | |
|---|---|---|---|
| 2,886,780 | 5/1959 | Schauffler | 340/870.06 |
| 2,905,385 | 9/1959 | Larse | 340/870.06 |
| 3,633,191 | 1/1972 | Engelhardt | 340/870.38 |
| 3,636,449 | 1/1972 | Partridge | 340/870.38 |
| 4,205,327 | 5/1980 | Dahlke | 374/172 |
| 4,294,116 | 10/1981 | Yamamura | 374/172 |
| 4,478,527 | 10/1984 | Mergner | 374/172 |

*Primary Examiner*—John W. Caldwell, Sr.
*Assistant Examiner*—Michael F. Heim
*Attorney, Agent, or Firm*—Mark P. Calcaterra

[57] ABSTRACT

A circuit and method to compensate for thermal effects on potentionmeter based sensors by presenting two input signals at different times to a comparator; the first utilizing one leg of the potentiometer and the second utilizing both legs. The comparator output will change states after receiving each input signal. The time periods between the receipt of the input signal and the outputs' change of state are stored.

The quotient of the time periods cancels out most of the thermal effects on the potentiometer and is still a representative of the original potentiometer signal.

4 Claims, 3 Drawing Figures

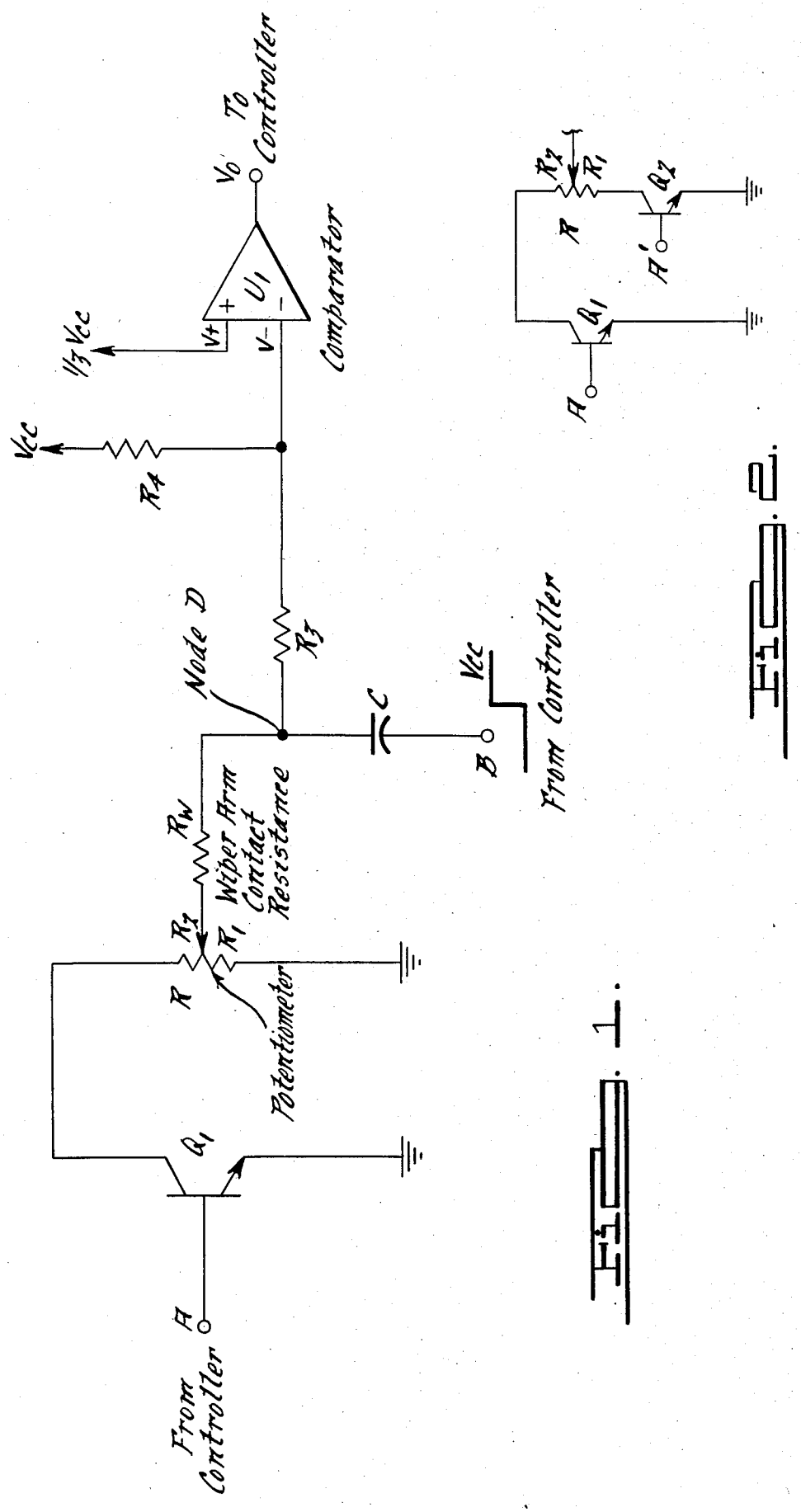

TEMPERATURE COMPENSATION CIRCUIT AND METHOD FOR POSITION SENSORS

BACKGROUND AND SUMMARY OF THE INVENTION

This invention relates to a circuit and method to reduce the effects of temperature on potentiometer based position sensors.

For devices which sense the position of a movable mechanical device or portion thereof, a potentiometer or variable resistor is often used. The wiper arm of the potentiometer is connected to the movable portion of the mechanical device such that motion of the device results in motion of the wiper arm. The changed resistance results in a signal which corresponds to the amount of motion of the mechanical device.

When this type of position sensor is employed in a high temperature environment, the potentiometer may exhibit a drop in resistance with increasing temperature. This change in resistance could be interpreted by the electronic monitor as a change in the position of the mechanical device. This false reading may result in an improper or untimely command being processed by the control circuitry.

The subject invention is designed to minimize the thermal effects on the position sensor. The scheme involves measuring the time needed for a comparator to change states given different input signals. The change-of-state time period under one input condition is divided by the time period under a second input condition. The quotient of the time periods is a function of resistance values which translates to a measure of the actuator's position. Both sides of the potentiometer are subject to the effects of temperature. These effects are cancelled out by taking the quotient of the time periods.

DESCRIPTION OF THE DRAWINGS

Other objects, features and advantages of the present invention will become more fully apparent from the following detailed description of the preferred embodiment, the appended claims and the accompanying drawings in which FIG. 1 is a schematic of an electronic circuit used to practice the preferred embodiment of the temperature compensation method described herein.

FIG. 2 is an alternative embodiment of the circuit shown in FIG. 1.

DETAILED DESCRIPTION OF THE PREFERRED EMBODIMENT

Figure 3:
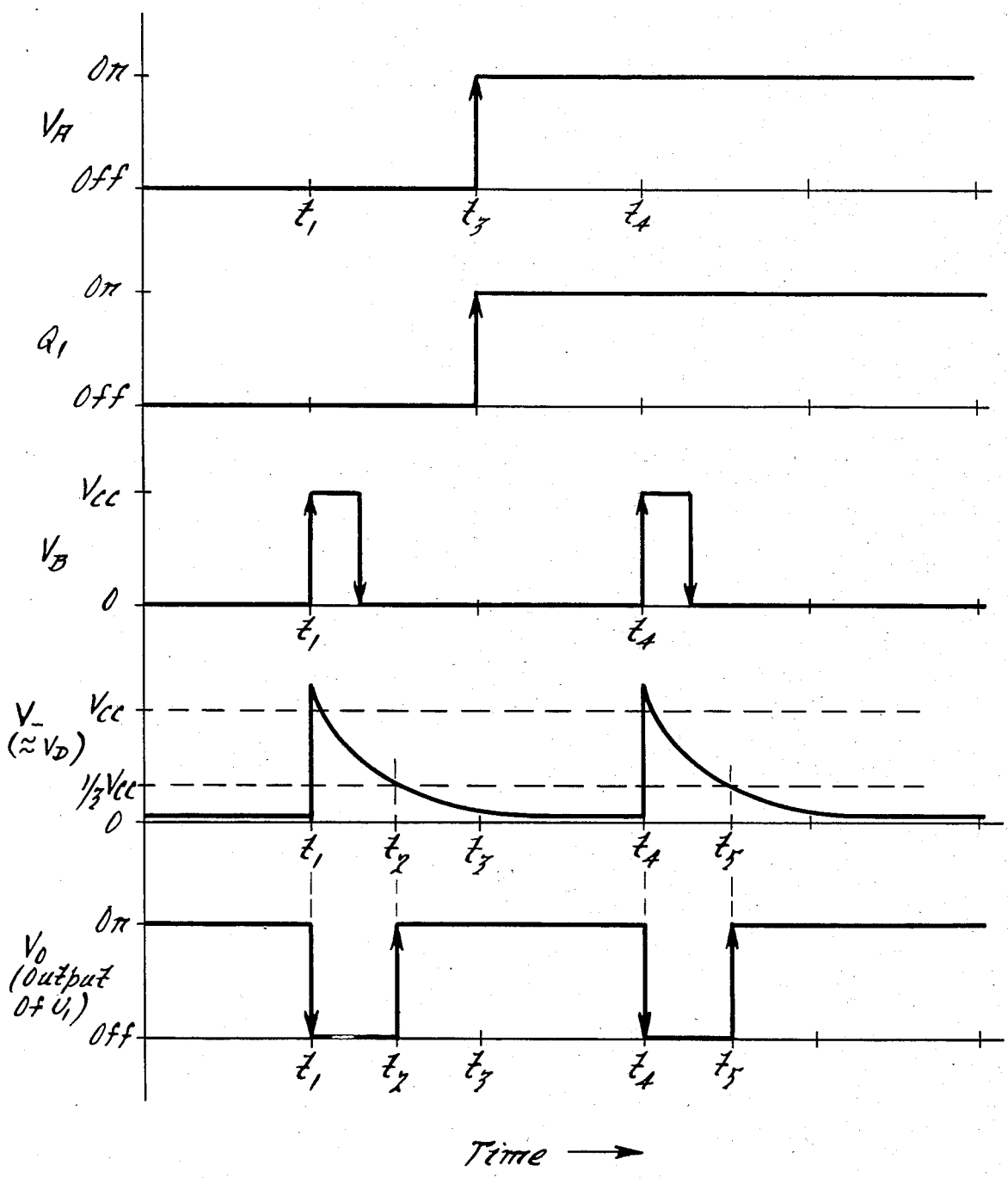
FIG. 3 is a voltage vs. time graph of selected points in the circuit shown in FIG. 1.

Referring to FIG. 1, the subject invention includes comparator means with the non-inverting input $V_+$ set to a value of $\frac{1}{3}$ of the supply voltage Vcc. The inverting input $V_-$ to the comparator is presented with a fluctuating signal, the time of the fluctuation being determined by the presence or absence of a control signal at nodes A and B. The fluctuation of the signal to the inverting input $V_-$ to comparator $U_1$ is also affected by the position of the wiper arm on a potentiometer R. The potentiometer's wiper arm is connected physically to the movable portion of a mechanical device. The motion of the movable portion of the mechanical device will then reflect itself in changing resistance values of $R_1$ and $R_2$.

The preferred embodiment shown in the FIG. 1 sets up comparator $U_1$ with its output being sent to a controller such as a microprocessor. The controller is able to store the output curve for comparator $U_1$. The non-inverting input $V_+$ to comparator $U_1$ is set as a reference level. In this case the reference level is $\frac{1}{3}$ Vcc. The inverting input $V_-$ to $U_1$ receives its voltage level from a network which is made up of resistor $R_4$ connected between the supply voltage Vcc and the inverting input $V_-$, resistor $R_3$, and a discharging loop connected to node D. Resistor $R_3$ is connected between the inverting input $V_-$ to $U_1$ and the discharging loop at node D.

The discharging loop is made up of a switching transistor $Q_1$ which receives its input command from the controller at node A, a potentiometer R and a capacitor C which receives its stimulus from the controller at node B. The capacitor C AC couples node B and node D. The potentiometer R is made up of two resistance portions $R_1$ and $R_2$ which vary in value depending on the location of the wiper arm. Also to be accounted for is the wiper arm contact resistance which is represented as a resistance $R_w$ connected between the wiper arm contact point to potentiometer R and node D. The wiper arm is electronically connected to node D and physically connected to the movable portion of the mechanical device. The $R_1$ portion of potentiometer R is connected between ground and the wiper arm; the $R_2$ portion of potentiometer R is connected between the wiper arm and the collector of switching transistor $Q_1$. The emitter of switching transistor $Q_1$ is connected to ground and the input signal from the controller to switching transistor $Q_1$ is made at node A to the base of the transistor.

The operation of the circuit is as follows:

Referring to FIG. 2 and FIG. 3, with the voltage $V_A$ at node A in a low state, transistor $Q_1$ is turned off and the discharging loop includes $R_1$ but not $R_2$. This is the case since transistor $Q_1$ blocks current flow from $R_2$ through $Q_1$ to ground. The voltage $V_A$ at node A is a controlled event, preferably from a control microprocessor.

The voltage $V_B$ at node B is also a controlled event. With transistor $Q_1$ turned off, and with the voltage $V_B$ at node B turned off, voltage $V_D$ at node D and at the inverting input $V_-$ to $U_1$ is held low resulting in the output voltage $V_0$ of comparator $U_1$ being on.

The above described events all have occurred between time zero and time $t_1$ on the voltage vs. time curves in FIG. 3.

At time $t_1$, the controller raises the voltage $V_B$ at node B to Vcc. Since capacitor C AC couples nodes B to node D the voltage $V_D$ will spike to Vcc (with a slight overshoot). The duration of this control pulse is unimportant so long as it resets to zero before time $t_4$.

Immediately after time $t_1$, the voltage at the inverting input $V_-$ crosses the fixed threshold voltage ($\frac{1}{3}$ Vcc) at the non-inverting input $V_+$, turning comparator $U_1$ off. The voltage at node D will peak at approximately Vcc and then begin to discharge through resistor $R_1$. This is the $R_1$ discharge path.

At time $t_2$, the voltage at the inverting input $V_-$ discharges down to the threshold voltage of $\frac{1}{3}$ Vcc turning comparator $U_1$ on.

The discharge time $t_2-t_1$ is stored by the controller as the representation of the $R_1$ path discharge time.

At time $t_3$, the controller changes the voltage $V_A$ at node A to a high state turning transistor $Q_1$ on and bringing $R_2$ in parallel with $R_1$ in the discharge path. This is the "$R_1$, $R_2$ path".

At time $t_4$, the controller pulses node B again, repeating the discharge events but this time utilizing the "$R_1$, $R_2$ path" for discharge.

The output $V_o$ of comparator $U_1$ turns off at time $t_4$ when the threshold voltage is exceeded at the $V_-$ input to $U_1$ and the comparator $U_1$ turns back on at time $t_5$ when $V_-$ drops below the threshold voltage $\frac{1}{3}$ Vcc.

The time period ($t_5-t_4$) is stored by the controller and represents the "$R_1$, $R_2$ path" discharge time.

The charging times are:

($t_2-t_1$) = $-R_1 C \times \ln(\frac{1}{3})$ and ($t_5-t_4$) = $-[R_1R_2/(R_1+R_2)]\, C \ln(\frac{1}{3})$.

The quotient of the times is:

($t_2-t_1$)/($t_5-t_4$) = $R_2/(R_1+R_2)$ and is a measure of the position of the movable mechanical device.

The quotient of the discharge times can be inverted and still be a measure of the position of the movable portion of the mechanical device. The quotient or its inverse must be used consistently throughout the analysis.

It can be seen that the error due to temperature effects is a function of the position of the wiper arm on potentiometer R. The error will be reflected unevenly in the numerator and denominator of the quotient. The temperature affects both arms of the potentiometer and the arm with the largest resistance will have a largest error. This affects the quotient since only one arm ($R_2$) is affected in the numerator of the quotient (or the denominator if the inverse quotient is used). Although this effect should be noted, it is not always significant; the temperature compensation provided by the circuit and method described above often provides enough compensation.

For some situations temperature effects can be dealt with more effectively by using the alternative embodiment shown in FIG. 2.

In this embodiment an additional transistor $Q_2$ is placed into the circuit between $R_1$ and ground, the collector of $Q_2$ connected to $R_1$ and the emitter of $Q_2$ to ground. The base of $Q_2$ is available for control signals from the controller at A'.

The method is then changed to measure the ($t_2-t_1$) time by keeping $Q_1$ off and turning $Q_2$ on, placing $R_1$ in the discharge path. The discharge time ($t_2-t_1$) is measured as before.

Then $Q_2$ is turned off and $Q_1$ is turned on placing only $R_2$ in the discharge path. The discharge time ($t_5-t_4$) is measured as before.

The result generates ($t_2-t_1$) as a function of $R_1$ and ($t_5-t_4$) as a function of $R_2$. The resulting quotient ($R_2/R_1$) will still contain an error which is a function of the resistance of each arm of potentiometer R; the larger the resistance, the larger the error.

While the present invention has been disclosed in connection with the preferred embodiment thereof, it should be understood that there may be other embodiments which fall within the spirit and scope of the invention and that the invention is susceptible to modification, variation and change without departing from the proper scope or fair meaning of the following claims.

I claim:

1. In a position sensing device to sense the position of a movable portion of a mechanism, the position sensing device with a controller to store data from and to present control signals to a temperature compensation circuit comprising:

a variable resistor with two end leads and a wiper arm;

a switching device connected across the two end leads of the variable resistor with the ability to short the two end leads upon command from a control signal from the controller to the device;

the wiper arm of the variable resistance device being mechanically connected to the movable portion of the mechanism;

a comparator with inverting and non-inverting inputs;

a voltage supply means, a fraction of which is connected to the non-inverting input to the comparator as a reference voltage;

a resistor connected between the wiper arm of the variable resistor and the inverting input to the comparator;

a capacitor with one lead connected to the wiper arm of the variable resistor and the other lead available for a step function control signal from the controller;

the comparator, changing output states when the voltage at its inverting input exceeds or drops below the reference voltage at the non-inverting input in response to the changing voltage on the capacitor as signaled by the controller;

the controller, storing the output curve of the comparator and providing a position signal representative of the position of the movable portion of the mechanism;

the position signal derived by comparing portions of the comprator's output curve generated in response to the step function control signals presented to the capacitor.

2. In a position sensing device to sense the position of a movable portion of a mechanism, the position sensing device with a controller to store data from and to present control signals to a temperature compensation circuit comprising:

a variable resistor with two end leads and a wiper arm;

a first switching device, connected between one end of the variable resistor and ground with the ability to receive control signals from the controller;

a second switching device, connected between the other end of the variable resistor and ground with the ability to receive control signals from the controller;

a comparator with inverting and non-inverting inputs;

a voltage supply means, a fraction of which is connected to the non-inverting input to the comparator as a reference voltage;

a resistor connected between the wiper arm of the variable resistor and the inverting input to the comparator;

a capacitor with one lead connected to the wiper arm of the variable resistor and the other lead available for a step function control signal from the controller;

the comparator, changing output states when the voltage at its inverting input exceeds or drops below the reference voltage at the non-inverting input in response to the changing voltage on the capacitor as signaled by the controller;

the controller, storing the output curve of the comparator and providing a position signal representative of the position of the movable portion of the mechanism;

the position signal derived by comparing portions of the comparator's output curve generated in response to the step function control signals presented to the capacitor.

3. A method of temperature compensating a potentiometer based position sensing system, the potentiometer comprising a variable resistor with end leads and a wiper arm, where the wiper arm is connected to the movable portion of a mechanical device, with a discharging circuit, comparator means and a controller means, including the steps of:

activating a first portion of the potentiometer to work with the charging circuit such that the resistance between the wiper and one of the two end leads of the potentiometer is utilized;

presenting a first control pulse from the controller to the charging circuit;

comparing the output of the charging circuit to a fixed threshold, forcing the comparator means to change states when the threshold is crossed;

storing the period between the first control pulse and the subsequent change of state of the comparator means;

activating a second portion of the potentiometer, that portion between the wiper arm and the other of the two end leads, to work with the charging circuit such that both the first portion and second portion are in parallel with each other with respect to the wiper arm;

presenting a second control pulse from the controller to the charging circuit;

comparing the output of the charging circuit to a fixed threshold, forcing the comparator means to change states when the threshold is crossed;

storing the time period between the second control pulse and the subsequent change of state of the comparator means;

using the quotient of the time periods as a representative measure of the motion of the movable portion of the mechanical device.

4. A method of temperature compensating a potentiometer based position sensing system, the potentiometer comprising a variable resistor with two end leads and a wiper arm where the wiper arm is connected to the movable portion of a mechanical device, with a charging circuit, comparator means and controller means, including the steps of:

activating a first portion of the potentiometer to work with the charging circuit such that only the resistance between the wiper arm and one of the two end leads of the potentiometer is utilized;

presenting a first control pulse from the controller to the charging circuit;

comparing the output of the charging circuit to a fixed threshold, forcing the comparator means to change states when the threshold is crossed;

storing the period between the first control pulse and the subsequent change of state of the comparator means;

activating a second portion of the potentiometer, that portion between the wiper arm and the other of the two end leads, to work with the charging circuit such that only resistance between the wiper arm and the other of the two end leads of the potentiometer is utilized;

presenting a second control pulse from the controller to the charging circuit;

comparing the output of the charging circuit to a fixed threshold, forcing the comparator means to change states when the threshold is crossed;

storing the period between the second control pulse and the subsequent change of state of the comparator means;

using the quotient of the time periods as a representative measure of the motion of the movable portion of the mechanical device.

* * * * *